June 20, 1961 H. SIGLER 2,988,979
EXPOSURE APPARATUS FOR PHOTOSENSITIVE MATERIALS
Filed Aug. 21, 1958 2 Sheets-Sheet 1

INVENTOR:
HAROLD SIGLER,
BY
Homer R. Montague

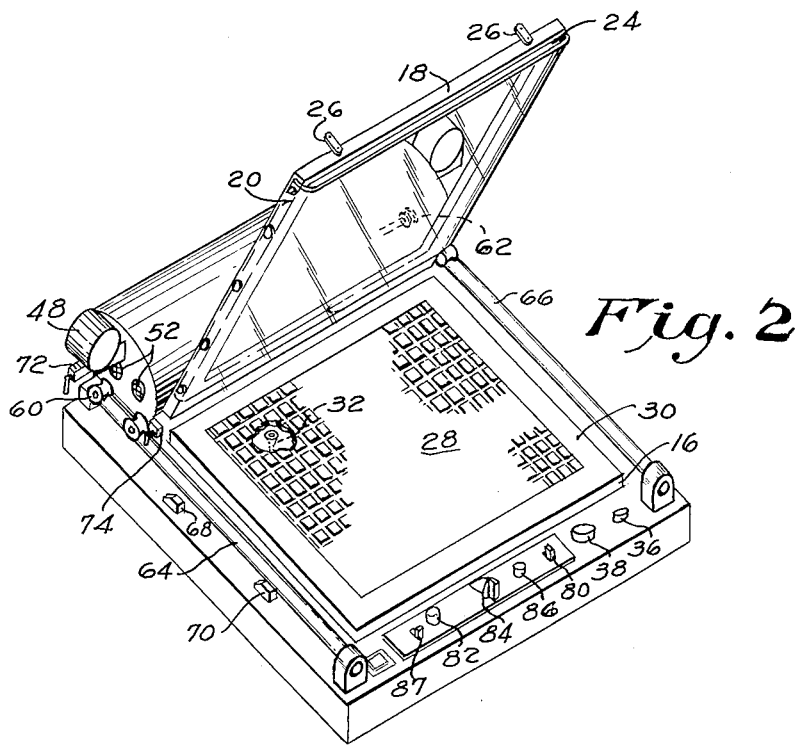

United States Patent Office 2,988,979
Patented June 20, 1961

2,988,979
EXPOSURE APPARATUS FOR PHOTOSENSITIVE MATERIALS
Harold Sigler, Brooklyn, N.Y., assignor to Fairchild Camera and Instrument Corporation, a corporation of Delaware
Filed Aug. 21, 1958, Ser. No. 756,441
1 Claim. (Cl. 95—76)

This invention pertains generally to exposure apparatus of the photographic type; more particularly, it pertains to apparatus of this type in which a photosensitive sheet material is held in close contact with a negative or other image-bearing sheet and subjected to rays of light passing through the latter to form a reproduction of the negative or master image. The word "negative" is used here in an illustrative sense, because whether the original or master image is a negative or a positive will depend both upon the nature of the photosensitive material and the use to which the reproduction is to be put. Various forms of such equipment have been proposed, especially for photographic printing, and while the apparatus of the present invention is adaptable to printing upon conventional photographic materials, it has features which especially adapt it for the exposure of the so-called photopolymer materials characterized by the ability to be locally hardened by the action of actinic rays such as visible light or ultraviolet radiation. Such materials, of which the prior art affords many examples, can be exposed as indicated above to produce selective local hardening in accordance with the master image, and can thereafter be developed as by washing out the unhardened portions to produce a relief image suitable for matting or even for direct surface printing by letter-press, offset or other familiar printing techniques.

Since materials, such as the photopolymers mentioned above, which are intended to yield a substantial relief image will generally be thicker and often stiffer than simple photographic film or paper stock, the ability to maintain intimate contact of the original or master with the material is an especially desirable feature of the equipment. Also, certain types of such materials require a higher total exposure than is common with ordinary photographic films or plates, which is not necessarily a disadvantage since it gives relative immunity to ambient light exposure or fogging. The apparatus of the present invention permits exposures of great magnitude to be given without any danger of movement between, or separation of, the master and the sensitive material.

It is accordingly a primary object of the present invention to provide an exposure frame assembly for photosensitive sheet materials and the like wherein a plurality of sheet materials may be held in extremely intimate contact with each other for exposure to a suitable light source.

Another object of the invention is to provide a light-exposure apparatus of the type including a self-contained scanning light source for effecting uniform exposure of a desired area wherein a plurality of sheet materials may be held in extremely intimate contact with each other for such exposure.

In accordance with one form of the present invention, the above and other objects are achieved by means of an exposure or printing apparatus employing an exposure frame assembly comprising a base plate and a clamping member preferably hingedly attached thereto. The upper or sheet-supporting surface of the base plate has a centrally located area defined by a plurality of interconnected grooves in the surface, which grooves may be connected to a suitable vacuum source through a conduit in the base plate. The pivotal clamping member comprises an open frame of approximately the same size as the base plate, the central opening of which is at least as large as the grooved area of the base plate, thus defining the maximum area of exposure. A flexible sealing or clamping sheet of optically transparent material is stretched across the face of the clamping member that is nearer the base plate, with a peripheral resilient bead being positioned between the clamping frame and the clamping sheet and adapted to be compressed in order to form a vacuum seal against the smooth or non-grooved peripheral portion of the base plate.

With the above considerations and objects in mind, the invention itself will now be described in connection with a preferred embodiment thereof given by way of example and not of limitation, and with reference to the accompanying drawings, in which:

FIG. 2 is a perspective view similar to FIG. 1, but showing the exposure frame of the apparatus in its open position.

FIG. 3 is a sectional view taken on line 3—3 in FIG. 1, but with the light source positioned over the exposure frame.

Figure 1:
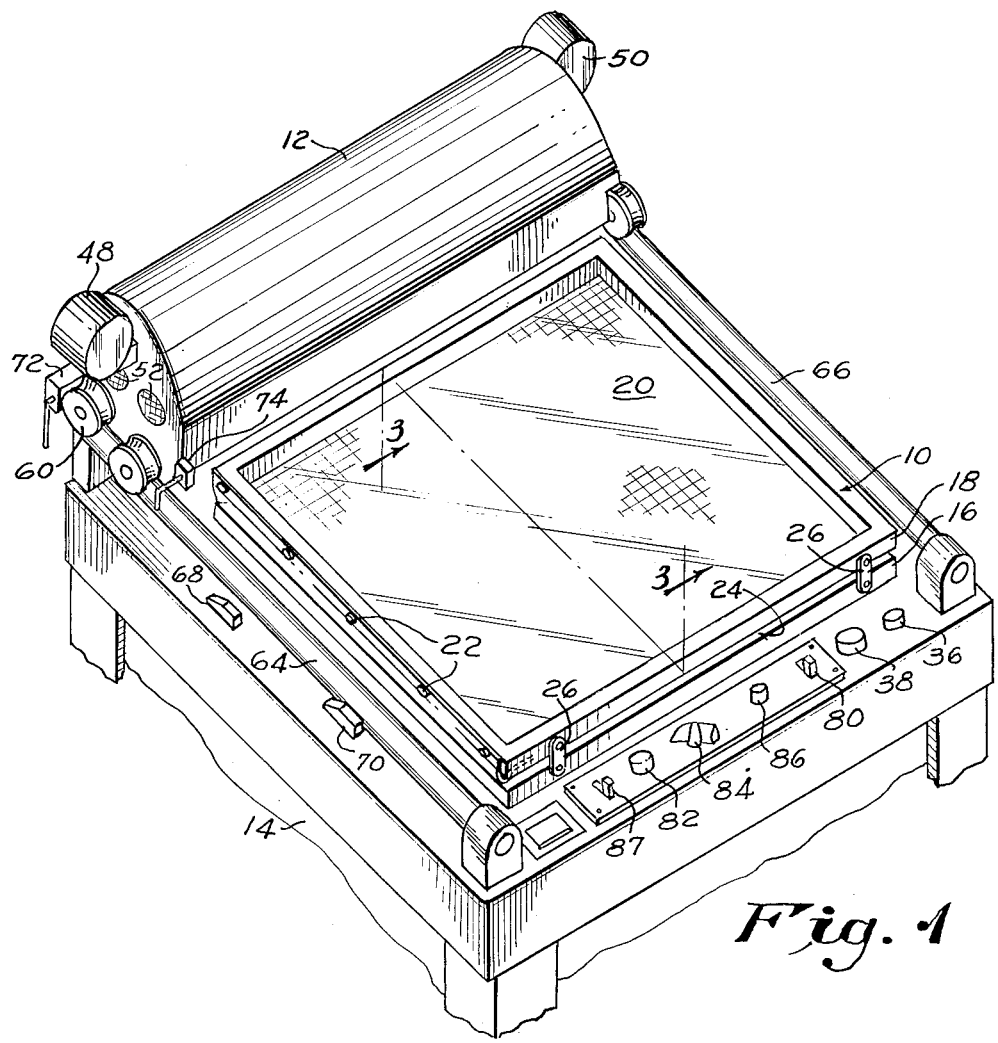
FIG. 1 is a perspective view of the apparatus of the invention, showing the general relationship of the several components thereof.

Referring now to FIG. 1, the apparatus of the invention is shown in a preferred form with the exposure frame indicated generally at 10, a scanning light source 12, and a main housing 14 serving as a support for both the light source and the exposure frame assembly. Exposure frame assembly 10 includes a base plate 16 and a clamping member 18 hingedly attached thereto. Clamping member 18 is in the form of an open frame, and a flexible, optically transparent clamping sheet 20 is stretched across the under side of member 18 and is secured thereto as by snap fasteners 22 or the like. A resilient bead 24 of any suitable material such as rubber or the like is attached to the underside of frame member 18 and serves as a cushion between that member and the transparent clamp sheet 20. Further, when clamping frame 18 is positioned adjacent base plate 16, resilient bead 24 is effective in locally pressing clamping sheet 20 firmly against the upper or photosensitive-sheet-supporting surface of base plate 16 to form a fluid seal. It will be understood, of course, that bead 24 forms a closed or continuous loop around the periphery of frame member 18, so that when the clamping member is in clamping position as shown in FIG. 1, and being held against base plate 16 by means of pivotal latches 26 or the like, the major portion of the upper face of base plate 16 is sealed under clamping sheet 20. Alternately, frame member 18 may be completely removable from base plate 16, and may be secured thereto during the clamping operation by latches such as shown at 26 but positioned on both the forward and rear edges of the frame.

As may better be seen in FIG. 2, the upper or sheet-supporting surface of base plate 16 includes a centrally located area defined by a plurality of interconnected grooves 28. The remaining area of this surface, that is, the peripheral area 30, has a smooth finish so as to form more efficiently a fluid seal with clamping sheet 20 where the latter is pressed against area 30 by resilient bead 24. Grooves 28 are shown arranged in a checkerboard or grid form, but any of many other suitable layouts may be employed so long as the several grooves are all interconnected and spaced sufficiently close together to afford an adequate vacuum grip as will better be understood in connection with further description of the apparatus herein. For some applications it has been found that the grooved area of base plate 16 may preferably include a plurality of mutually perpendicular grooves on the order of one sixteenth of an inch wide, one thirty-second of an inch deep and spaced one half inch between centers. However, it will be understood that such dimensions are merely exemplary of the order of magnitudes found to be satisfactory for one application of the apparatus of the invention, since the particular dimensions and spacing between grooves 20 in no way form a part of the invention. A fluid conduit 32 in base plate 16 connects with one of the grooves 28 at any suitable point in the grooved area. Since grooves 28 are all interconnected, connection of conduit 32 to any one of the grooves effectively connects the conduit to all of the grooves. A pump 34 (see FIG. 3) in housing 14 is connected to conduit 32 by means of suitable hose connections including a valve 36 and pressure indicator 38 so that the degree of vacuum which is created under clamping sheet 20 by means of pump 34 and grooves 28 may be controlled in a satisfactory manner.

The scanning light source indicated generally at 12 includes within the outer housing an elongate lamp 40 or the like positioned under and approximately coextensive with a reflector 42 having a circular or, and more preferably in the case of a line source of light, a parabolic cross section. Reflector 42 not only reflects the upwardly-directed light emanating from lamp 40 so as to re-direct it toward the aperture 44 (see FIG. 3) for concentration of the light leaving the scanning housing, but serves as a heat shield between lamp 40 and a motor 46 which is the motive power source for the scanning operation. In order to assist in the dissipation of the heat produced by lamp 40, blowers 48 and 50 are positioned at respective ends of the light source housing, and the air blast that is produced by each of these blowers is directed under reflector 42 in part in order to cool lamp 40 and over the reflector in part in order to pass cooling air over scanner motor 46 and out of the housing through suitable apertures 52.

The construction of scanning light source 12 and the manner of operation thereof in making an accurately timed exposure of photosensitive sheet material held in exposure frame 10 are explained in considerable detail in the co-pending application of Samuel W. Levine et al., Serial Number 610,270, filed September 17, 1956, now Patent No. 2,919,635. It will suffice here to state that scanning motor 46 is connected by suitable gearing 54 and 56 to the common axle 58 of a pair of drive wheels or pulleys 60 and 62 which ride on and frictionally engage respective rails or runners 64 and 66. Adjustably positioned on rail 64 are a pair of scan-stop members 68 and 70, which define the limits of scan travel of the light source by reversing the direction of operation of motor 46 each time one or the other of the stops is struck by the respective reversing switches 72 and 74. It will be understood that reversing switches 72 and 74 are connected in an electrical circuit which also includes motor 46 and a suitable voltage source not shown.

Referring now to FIG. 3 in particular, the manner in which a vacuum seal is achieved in order to effect the desired clamping action is more easily seen. With the clamping frame 18 held firmly pressed against base plate 16 through resilient bead 24 and clamping sheet 20, a sealing action takes place between clamping sheet 20 and base plate 16 in a closed loop around the periphery of the sandwiched exposure frame assembly where the pressure transmitted by resilient bead 24 causes clamping sheet 20 to be firmly pressed against the smooth finish of peripheral area 30 of base plate 16. The area defined by grooves 28 in the photosensitive sheet supporting-surface of base plate 16 is somewhat larger than the area of the largest negative or light-sensitive sheet intended to be used in connection with the apparatus. Thus, the outermost of grooves 28 are never covered by even the largest photosensitive sheet 76 or the associated negative or master sheet 78. In this manner, when a vacuum is drawn through conduit 32, the pressure within the sealed area under clamping sheet 20 is uniformly reduced, and the external atmospheric pressure therefore is effective in pressing the central area of clamping sheet 20 firmly down on the sheets 76 and 78 to hold them in intimate contact for exposure to light emanating from lamp 40 as it scans across the exposure area.

In the operation of the apparatus of the present invention, the upper or clamping member 18 of the exposure frame assembly is raised to allow the placement of photosensitive sheet 76 thereon with the emulsion or sensitive side up. The negative sheet 78 (which may in practice comprise a plurality of separate sheets each bearing a master image to be reproduced on sheet 76) is then placed over sensitive sheet 76, and clamping member 18 is lowered and firmly clamped to base plate 16 by means of latches 26. When these latches are locked in position, a sufficient force is exerted through resilient bead 24 to press the flexible clamping sheet 20 firmly down against the smooth finish of the peripheral area 30 of base plate 16 to form a fluid seal for the vacuum that is desired. With sheets 76 and 78 thus sealed between the base plate 16 and flexible clamping sheet 20, a suitable source of vacuum is connected to conduit 32 as by energizing pump 34 upon closure of pump switch 80 and regulating the degree of vacuum in the clamping frame by means of needle valve 36. As will be understood by those skilled in the art, certain materials permit reflex exposure, wherein sheets 76 and 78 would be interchanged from the respective positions shown in FIG. 3.

Scan-stop members 68 and 70 are spaced apart a distance corresponding to the desired travel of the scanning light source 12, this distance usually being the length of the photosensitive sheet 76 in the direction of scan. With the scan length thus defined, "start" button 82 is depressed to connect scan motor 46 to a suitable source of voltage by means of electrical circuitry not shown but substantially the same as that shown and described in the aforementioned application of Samuel W. Levine et al. As light source 12 scans across the top of the exposure frame assembly, the light emanating therefrom passes through the substantially transparent clamping sheet 20 and negative or master sheet 78 selectively to expose portions of the light-sensitive sheet 76 in accordance with the image information of sheet 78. The original direction of scan is continued until reversing switch 72 is contacted by stop member 68, whereupon the direction of operation of scanning motor 46 is reversed, and the scanning operation is repeated, but in the opposite direction, until a similar reversal takes place when reversing switch 74 contacts stop member 70. The exposure is thus effected through a time period determined by the setting of a time switch indicated at 84 and which determines the number of scanning cycles that the light source 12 executes for a given exposure. As previously stated, the particular means for carrying out the scanning operation are shown and described in one preferable form in the aforementioned Levine application. If desired, of course, the exposure may be timed manually, and a "stop" switch 86 is provided for this purpose. Further, a master "on-off" switch 87 may be included to control the application of electrical power to the apparatus as a whole.

Upon completion of the exposure, pump switch 80 is operated to deenergize pump 34, and latches 26 may then be released to allow opening of the exposure frame and removal of the exposed photosensitive sheet 76 for development or other suitable processing.

In some applications where the negative or other master is in reality a plurality of separate small sheets which must be arranged into a desired composition or layout, it sometimes proves convenient to carry out the art composition at a point remote from the exposure machine. The apparatus of this invention is readily adaptable to this type of operation, since the base plate 16 may easily be made removable from a suitable mount in the top of housing 14. Appropriate quick-disconnect fasteners may be utilized to hold base plate 16 in the exposure machine when the exposure is being made, and a valve 88 in conduit 32 serves to hold a vacuum in the exposure frame assembly as it is transported from the composition room to the exposure machine. A suitable pipe coupling 89 is provided for connecting conduit 32 to such vacuum source. The manner of carrying out this type of remote composition is readily apparent. The desired arrangement of the negative or other master materials is made on base plate 16 of the open exposure frame in the composition room remote from the exposure apparatus. The frame is then closed, valve 88 is opened and conduit 32 is connected to a suitable source of vacuum in the composition room. When the desired degree of vacuum clamping is achieved (otherwise in the same manner as described for the case where the exposure frame is in position in the exposure apparatus when the vacuum is drawn), valve 88 is closed and the exposure frame is removed from the vacuum source and carried to the exposure machine. Once the frame is locked in place in the machine, conduit 32 may be connected to vacuum pump 34 by means of coupling 89, and valve 88 re-opened to allow pump 34 to maintain the desired degree of vacuum grip, which might otherwise eventually be lost in part due to small unavoidable leakages in the vacuum seal.

Whether the exposure frame is removable or not, where the apparatus is intended for use in exposing sheets of photopolymer materials to actinic light to produce therein relief images corresponding to the image information of the negative or other master, it is particularly important to achieve intimate contact between such sheet material and the master sheet. In most instances, both the negative and the photopolymer sheet will have highly polished surfaces, and as a result it is often quite difficult to avoid the occlusion of small pockets of air between such sheets. In general, any occluded air will cause mottling of the reproduced image in the photopolymer sheet, and in half-tone work in particular, where the individual characters are quite small, it becomes increasingly important to achieve intimate contact between the sheets to avoid undercutting of the characters with resulting mechanical instability. The vacuum-held, flexible clamping sheet of the present invention avoids such difficulties and affords a particularly intimate grip due to the ability of the flexible sheet to conform to irregularities in the materials being clamped.

The invention has been described above in considerable detail, and particularly with reference to its application to the selective exposure of sheets of photopolymer materials in accordance with desired negative or master sheet information. However, it will be apparent to those skilled in the art that the invention is also applicable to other types of photosensitive sheet materials, and may even be applied to situations where no light exposure is involved but where it is otherwise necessary to hold a plurality of sheet materials together in intimate contact for chemical or other processing. Hence, the invention is not to be considered as limited to the particular details given, nor to the specific application to which reference has been made during the description of the apparatus, except insofar as may be required by the scope of the appended claim.

What is claimed is:

A vacuum-type holder for the exposure to printing illumination of superposed sheet-like materials, comprising a rigid base plate having the centrally located region of a sheet-supporting surface thereof defined by a plurality of interconnected grooves in said surface, the peripheral area of said surface about the grooved region having a smooth finish, a rigid open-frame clamping member formed of coplanar frame elements, and adapted to have one face thereof positioned adjacent said surface of the base plate, the open area of said clamping member within said frame elements being significantly larger than said grooved centrally located region, a flexible light-transmitting clamping sheet secured in stretched condition to opposite ones of said frame elements of said clamping member and extending entirely across said one face thereof, a continuous resilient bead positioned between all of the frame elements forming said clamping member and said clamping sheet, and thus defining a closed loop upstanding bead on said one face of said clamping member congruent with the smooth peripheral area of said base plate surface, and a fluid conduit in said base plate in communication with said grooves and adapted to be connected to a vacuum line.

References Cited in the file of this patent

UNITED STATES PATENTS

| | | |
|---|---|---|
| 2,173,168 | Hughes | Sept. 19, 1939 |
| 2,591,449 | Ludwig | Apr. 1, 1952 |
| 2,739,516 | Hosterman | Mar. 27, 1956 |
| 2,774,289 | Collins | Dec. 18, 1956 |
| 2,826,976 | Gelb | Mar. 18, 1958 |
| 2,836,099 | Weishaupt | May 27, 1958 |